G. E. WITHERELL & E. R. SEWARD.
DIE HOLDER.
APPLICATION FILED DEC. 14, 1906.

915,144.

Patented Mar. 16, 1909.

Witnesses:
S. S. Grotta.
L. E. Berhovitch.

Inventors
George E. Witherell,
Per Ernest R. Seward,
Arthur B. Jenkins,
Attorney.

THE NORRIS PETERS CO., WASHINGTON, D. C.

UNITED STATES PATENT OFFICE.

GEORGE E. WITHERELL AND ERNEST R. SEWARD, OF HARTFORD, CONNECTICUT, ASSIGNORS TO THE HARTFORD MACHINE SCREW COMPANY, OF HARTFORD, CONNECTICUT, A CORPORATION OF CONNECTICUT.

DIE-HOLDER.

No. 915,144.  Specification of Letters Patent.  Patented March 16, 1909.

Application filed December 14, 1906. Serial No. 347,773.

*To all whom it may concern:*

Be it known that we, GEORGE E. WITHERELL and ERNEST R. SEWARD, citizens of the United States, and residents of Hartford, in the county of Hartford and State of Connecticut, have invented a new and Improved Die-Holder, of which the following is a specification.

The improvement relates more especially to that class of machine tools employed for holding a die while cutting a thread upon a rod or the like, and the object of the invention is to provide an extremely strong yet compact tool, and one in which the length of thread to be cut may be accurately determined and the adjustments for such purpose may be readily made; and a further object of the invention is to provide a tool which is extremely cheap in construction and efficient and accurate in operation.

A form of device in the use of which these objects may be attained is illustrated in the accompanying drawings, in which—

Figure 1:
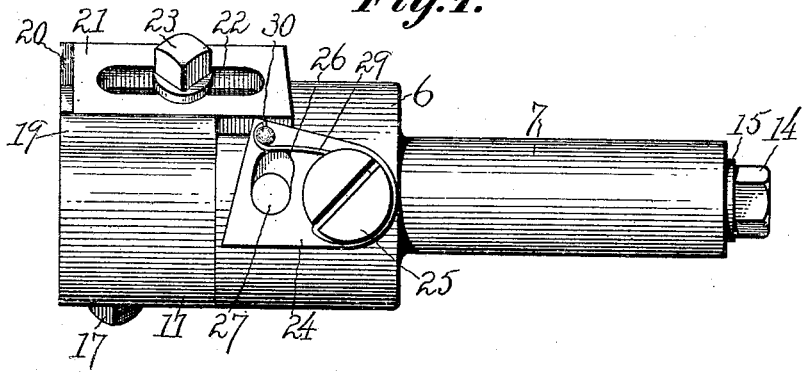
Figure 2:
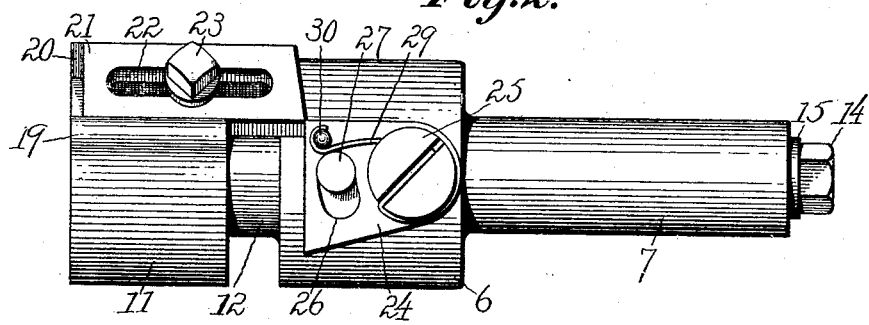
Figure 3:
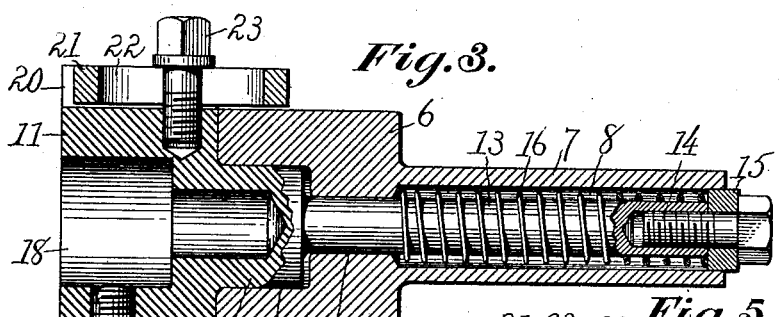
Figures 4, 5:
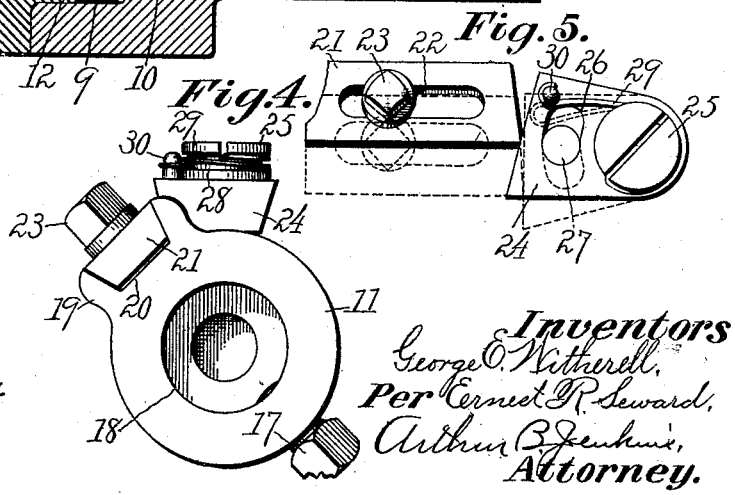

Figure 1 is a side view of a die holder embodying the invention. Fig. 2 is a similar view but showing the gage bar at the point of release from the latch. Fig. 3 is a view partly in lengthwise central section showing the construction of the holder. Fig. 4 is an end view. Fig. 5 is a diagrammatic view illustrating the relative positions of the gage bar and latch after the release of said parts, and in dotted lines a further relative position of the parts.

In the accompanying drawings the body part is illustrated as composed of a head 6 from which a shank 7 projects, this shank being suitably constructed for engagement in a turret of a screw machine, or like part for supporting the holder. The chamber 8 is formed in the shank and a recess 9 is formed in the head, an opening 10 communicating between the two. The holder 11 has a tub 12 located within the recess 9, and a stem 13 projecting through the head and its shank. A screw 14 fits a threaded opening in the end of the stem and a collar 15 may be employed to take the thrust of one end of a spring 16, the opposite end of which rests against the bottom of the chamber 8, thus forcing the body or head 6 and holder 11 normally together. A screw 17 may be provided for holding the die in position in the die recess 18. An enlargement 19 is formed on the side of the holder and a groove 20 is formed in this enlargement. This groove has its side walls preferably flaring outward from the bottom, as plainly shown in Fig. 4 of the drawings. A gage bar 21 is formed to fit this groove and has a slot 22 through which a set screw 23 projects, this set screw being secured within the holder 11. By this means the gage bar may be positioned lengthwise of the tool. A latch 24 is mounted on a pivot 25 secured to the head 6. This pivot may consist of a headed screw, as shown herein. A slot 26 is formed in the latch within which a stud 27 is located to limit the swinging movement of the latch. The head of the pivot has a circumferential groove 28, as plainly shown in Fig. 4 of the drawings, and a spring 29 with one end located in the slot in the head of the screw is wrapped about within this groove, its opposite end engaging a pin 30 secured to the latch, this spring thrusting the latch in a direction opposite to that in which the holder travels when it is released therefrom. The free end of the latch is beveled, as plainly shown in the drawings, that edge engaging the gage bar in the cutting operation and which we have termed "the holding edge" or "retainer" being the shorter.

In the operation of the device the gage bar 21 is set with its end projecting beyond the end of the latch at the side of engagement a distance approximating the length of the thread to be cut upon the screw. The tool as a whole being fed forward in the movement of the turret or like part supporting the tool the die is brought into engagement with the piece of work upon which the thread is to be cut. The cams or other devices for causing this movement of the die holder toward the work exert force simply to engage the die with the work. The holder 11, as the blank is rotated, is forced against the shorter or holding edge of the latch 24 and by the cutting operation of the die, is withdrawn from the head 6 and against the tension of the spring 8. When the end of the gage bar 21 arrives opposite the end of the retainer or holding edge of the latch 24 and is released it is forced by the spring 29 to the position shown in Fig. 5, the stud 27 being thus located at the opposite end of the slot from the position shown in Fig. 2. This causes the retainer or holding edge of the latch to retreat or be removed from the path of movement of the gage bar. The power applied to rotate the blank now causes the holder 11 to be rotated, the gage bar 21 in this movement at the time of striking the latch occupying the position shown in full lines in Fig. 5. As the gage bar continues to rotate with the head 11 the parts occupy the positions shown in dotted lines in Fig. 5 when the gage bar is released from the latch and the latter again resumes its position of rest.

In the repeated contact of the gage bar with the latch in the rotation of the head before parts of the machine are operated to reverse the direction of rotation of the blank and thus run the holder off from the latter the gage bar strikes the end of the latch at a point intermediate its edges. The retainer or holding edge of the latch and the gage bar which coöperate to determine the length of the screw thread are thus separated so that in the continued rotation of one of the parts contact is prevented. This movement of the retainer so that it is not struck by the gage bar in its rotation we have termed herein "removal from the path of contact." The point of the gage bar is worn to a minimum extent for the reason that the latch readily yields to allow the gage bar to pass. It will thus be seen that the form of the parts is practically maintained for great lengths of time, thus insuring the accuracy of work produced by the tool.

The opposite edge of the latch from the retainer is so located that it is placed in the path of movement of the gage bar as it is rotated backward, and as the blank is given a rotation in a reverse direction the gage bar striking this latch holds the die that is thus forced off from the blank. This means of retaining the holder against rotation in either direction at certain times, in the structure herein shown and described, are embodied in a single device, but any device which provides for the separation of the gage and retainer to remove one from the path of movement of the other are considered as within the limits of the invention. The term "forward rotation" as used herein meaning that direction in which the holder rotates when released in the cutting of the thread, and "backward rotation" meaning a rotation of the holder in the opposite direction.

It will be seen by reference to the drawing and from the foregoing description that the pin or pivot that connects the latch 24 with the head 6 is located in, or in proximity to, a plane including the axis of rotation of the tool holder, and that the latch itself is mounted so that its longitudinal axis is approximately parallel to the said axis of rotation, as distinguished from being mounted transversely thereto. From this it follows that the gage bar and the latch, when in the act of separation, are moving with relation to each other in the direction of the length of the latch, and that when separation takes place and rotation of one relative to the other is permitted the gage bar passes the free end of the latch, with the beveled end of which it may engage as has been described. It will also be observed that the gage bar engages with the side edges of the latch when the members come together to cause mutual rotation of the parts that carry them.

The pin 27 and slot 26 that coöperate to limit the swinging movements of the pivoted latch are so disposed that when the gage bar and latch are in normal working positions to cause a forward movement of the tool to cut the thread, the edge of the latch that engages the bar is preferably parallel with the axis of the tool holder, as indicated in Fig. 2; but when the gage bar and latch separate, by reason of the relative longitudinal movements of these parts, the latter is free to be moved by the spring 29, the pin in the slot causing the arrest of the latch in such position that the gage bar in its forward rotation will pass that working edge or face of the latch with which it was just in engagement and will also pass the free end of the latch; the opposite working face or edge of the latch being so disposed that on a reverse movement being imparted to the gage bar the latter will engage the said working face and be arrested by the latch after it has moved the extent allowed by the slot 26, as will be clear from an examination of Fig. 5.

What we claim as our invention and desire to secure by Letters Patent is:—

1. The combination of a tool holder, a support therefor, one of these parts being longitudinally movable with respect to the other, a gage bar carried by one of the said parts, a pivoted latch having a limited turning movement secured to the other part, the latch being so mounted that when the parts are longitudinally moved to cause separation of the pivoted latch and gage bar, the holding edge of the former moves out of the path of the latter and its other working edge moves into said path to be engaged thereby when its direction of rotation is reversed, and means tending to hold the latch normally in one position.

2. The combination of a tool holder, a support therefor, one of these parts being longitudinally movable with respect to the other, a gage bar carried by one of the said parts, a pivoted latch having a limited movement secured to the other, the latch being so mounted that the gage bar is arranged to engage with a side edge thereof when the said parts are rotated, and being also so arranged that when the parts are longitudinally moved to cause separation of the pivoted latch and the gage bar, the latter moves past the free end of the former, means for limiting the movement of the latch about its pivot arranged to arrest it in position with its free end disposed substantially at right angles to the axis of rotation of the tool holder when the gage bar and latch are in working engagement to cause a forward feed to the cutting tool, and to arrest it in position with the said free end oblique to the axis of rotation when the gage bar and latch are separated, and yieldable means tending to hold the latch in the latter position.

3. The combination of a tool holder, a support therefor, these parts being free to rotate together, and one being longitudinally movable with respect to the other, a gage bar carried by one of the said parts, a pivoted latch having a limited turning movement secured to the other, being arranged so that its longitudinal axis is approximately parallel to the axis of rotation of the tool holder the free end of the latch being beveled, and its side edges, one of which is longer than the other, being arranged to be engaged by the gage bar as the tool holder is arrested in its rotative movement relative to its support, the latch being so mounted that when it and the gage bar separate by longitudinal movement of the parts, the gage bar passes the free beveled end of the latch, and a spring acting upon the latch.

4. The combination of a head and a holder rotatably supported, one with respect to the other, a gage bar located upon one of the parts, a latch pivoted to the opposite part and arranged to swing transversely to the axis of the device, and having its two longitudinal side edges arranged to be engaged by the gage bar, engagement with one edge preventing forward relative rotation, and with the other backward relative rotation of the gage-carrying part, means for limiting the swinging movement of the latch, the latch when at the limit of its movement in one direction having its said first mentioned edge in position to be engaged by the gage bar, and when at its other limit of movement having its second mentioned edge in operative position to be engaged by the gage bar but with its first mentioned edge out of the path of rotation thereof and means tending to yieldingly hold the latch in one position.

5. The combination of a head and a holder rotatably supported, one with respect to the other, a gage bar carried by one of the parts, a latch pivoted to the other and free to move about its pivot to a limited extent, and having its two longitudinal side edges arranged to be engaged by the gage bar, engagement with one edge preventing forward relative rotation and with the other backward relative rotation of the gage-carrying part, means for limiting the swinging movement of the latch, the latter when at the limit of its movement in one direction having its first mentioned edge in position to be engaged by the bar, and when at its other limit of movement having its second mentioned edge in operative position to be engaged by the bar but with its first mentioned edge out of the path of rotation thereof, and means for normally holding the latch in the said first mentioned position.

6. The combination of a head and die or tool holder rotatably supported one with respect to the other, a gage bar located upon one of the said parts, a latch pivoted to the other part and arranged to lie in the path of movement of the gage bar, said latch having its two side edges arranged to be respectively engaged by the gage bar, as it is rotated in one direction or the other, and its end, when the latch is disengaged from said gage bar, to lie obliquely across the path of movement of the end of the gage bar, means for limiting the swinging movement of the latch and means tending to hold the latch in one position, but yieldable so as to permit the gage bar to pass the latch when the bar is rotated in one direction.

7. The combination of a head and die or tool holder rotatably supported one with respect to the other, a gage bar located upon one of the said parts, a latch pivoted to the other part and having a swinging movement, means for arresting the swinging movement of the latch and serving also to hold the die holder against rotary movement relative to the head, the two edges of the latch being arranged for engagement with the gage bar, each edge arranged to prevent movement of the gage bar in a direction opposite to that to which it is retained by the other edge, yieldable means tending to hold the latch in one position.

GEORGE E. WITHERELL.
ERNEST R. SEWARD.

Witnesses:
ARTHUR B. JENKINS,
EDWARD J. McGINN.